N. F. White,
Bee Hive.
No. 104,521. Patented June 21, 1870.

Witnesses:
A. Bennerkendorf
L. S. Mabee

Inventor:
N. F. White
per [signature]
Attorneys.

United States Patent Office.

NATHANIEL F. WHITE, OF MOUNT PLEASANT, IOWA.

Letters Patent No. 104,521, dated June 21, 1870.

IMPROVEMENT IN BEE-HIVES.

The Schedule referred to in these Letters Patent and making part of the same.

*To all whom it may concern:*

Be it known that I, NATHANIEL F. WHITE, of Mount Pleasant, in the county of Henry and State of Iowa, have invented a new and useful Improvement in Honey-bee Palace; and I do hereby declare that the following is a full, clear, and exact description thereof, which will enable others skilled in the art to make and use the same, reference being had to the accompanying drawing forming part of this specification.

This invention relates to a new and useful improvement in a house or palace for honey-bees, in which their hives are placed, and where they are protected from moths and from the weather; and It consists in the construction and arrangement as hereinafter more fully described, In the accompanying drawing—

Similar letters of reference indicate corresponding parts.

This bee-palace, A, consists of an outer wall, B, elevated on legs, or in any other convenient manner, and of suitable size to receive any desired number of hives and honey-boxes.

C represents the hives, which are placed in tiers on the sides of the palace, with a dead-air space between them and the outer wall, so that the bees are protected from the extreme cold of winter, and the honey or comb, as well as the bees, from the extreme heat of summer.

The bee-entrance to the hive is through the side walls of the palace.

A tube, D, passes through the walls for each hive, which is left open during the day, but closed at night, for the exclusion of the moth-miller, by the perforated metallic shutters D'.

E represents a tubular air-valve for each tier of hives, which communicates with the front of the palace by metallic tubes, which pass through the front walls.

These air-tubes are covered by perforated metallic shutters, the same as the bee-entrance in the side walls.

The valves E, as well as the hives, are kept in place and in their proper position by means of removable frames and slats, as seen at F and G.

H represents the door in the front of the palace.

I represents the honey-box as on the hive.

J are apertures through the back wall of the hive, which are plugged up except when it is necessary to allow bees to pass out when they by any means get into the palace or out of their hives.

Access to the hive is obtained by taking out the backs, after entering the palace. These backs are fastened by two nails, partly driven. When removed, the comb-cleats may be taken out, and the honey-boxes or drawers I may be inspected or removed.

Figure 2:
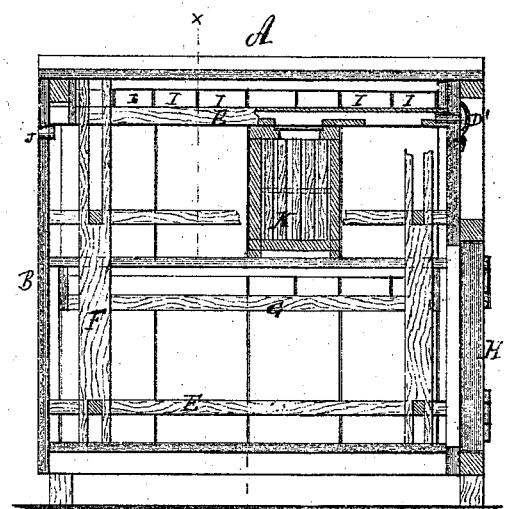
Figure 2 is a vertical section of fig. 1 on the line $y\ y$.
Figure 3:
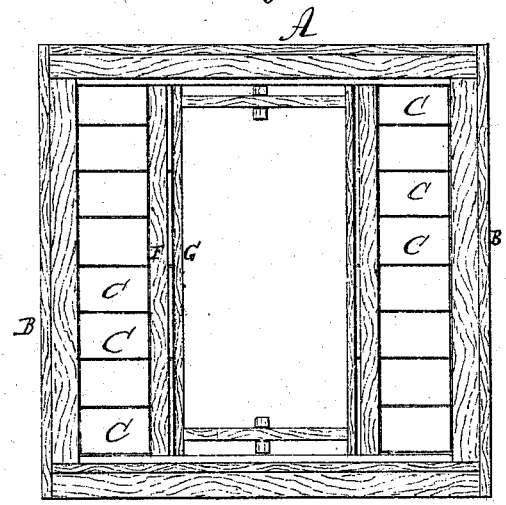
Figure 3 is a top view with the cover off.

The comb-cleats in the hive are seen at K, fig. 2.

Figure 1:
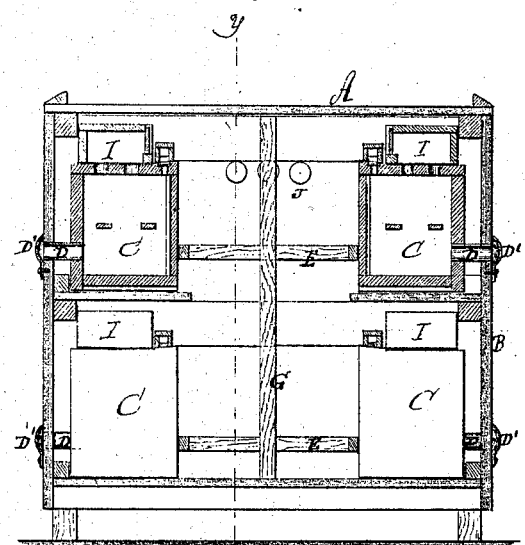
Figure 1 represents a vertical section of fig. 2 on the line $x\ x$.

The apertures for the passage of the bees from the hives to the honey-boxes, seen in fig. 1, at L, separating the hives from the outer walls of the palace by an air-space, besides screening them from the outer atmosphere by those walls, effectually protect the bees and the honey at all seasons of the year.

Having thus described my invention,

I claim as new and desire to secure by Letters Patent—

In combination with the bee-palace A, the hives C, honey-boxes I, entrance-tubes D, with the perforated shutters D', and the air-valves E, with the removable cleats and frames F and G, the whole arranged substantially as and for the purposes herein shown and described.

NATHANIEL F. WHITE.

Witnesses:
W. D. LEEDHAM,
BENJ. BEESON.